United States Patent
Guthrie

(10) Patent No.: US 9,146,452 B2
(45) Date of Patent: Sep. 29, 2015

(54) MULTI-COLOR ILLUMINATION APPARATUS

(71) Applicant: CHRISTIE DIGITAL SYSTEMS USA, INC., Cypress, CA (US)

(72) Inventor: Simon Guthrie, Kitchener, CA (US)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 81 days.

(21) Appl. No.: 13/796,716

(22) Filed: Mar. 12, 2013

(65) Prior Publication Data

US 2014/0268066 A1    Sep. 18, 2014

(51) Int. Cl.
*G03B 21/00* (2006.01)
*G03B 21/20* (2006.01)
*G02B 26/00* (2006.01)
*F21V 9/10* (2006.01)
*H04N 9/31* (2006.01)

(52) U.S. Cl.
CPC .............. *G03B 21/204* (2013.01); *F21V 9/10* (2013.01); *G02B 26/008* (2013.01); *G03B 21/2006* (2013.01); *H04N 9/3155* (2013.01); *H04N 9/3197* (2013.01)

(58) Field of Classification Search
CPC .. G03B 21/00; G03B 21/204; G03B 21/2013; H04N 9/3155; H04N 9/3197
USPC .............. 353/31, 84, 85, 94, 98, 99; 348/742–747, E5.139, E9.027; 362/19, 362/231, 293, 294, 555, 583, 284, 324
See application file for complete search history.

(56) References Cited

U.S. PATENT DOCUMENTS

| | | | |
|---|---|---|---|
| 2,416,301 A | 2/1947 | Goldmark | |
| 6,147,720 A | 11/2000 | Guerinot et al. | |
| 7,547,114 B2 * | 6/2009 | Li et al. ........................ | 362/231 |
| 7,651,243 B2 | 1/2010 | McGuire, Jr. et al. | |
| 7,862,182 B2 | 1/2011 | Thollot et al. | |
| 7,871,168 B2 | 1/2011 | Liu et al. | |

(Continued)

FOREIGN PATENT DOCUMENTS

WO    WO2005067288 A1    7/2005

OTHER PUBLICATIONS

Corresponding European Patent Application No. 14158575.2, Extended European Search Report, dated May 19, 2014.

*Primary Examiner* — Sultan Chowdhury
(74) *Attorney, Agent, or Firm* — Perry + Currier, Inc.

(57) ABSTRACT

A light engine is provided for a projection system, comprising a color wheel having a plurality of color phosphor portions; at least two light sources for illuminating the wheel at different locations for generating at least two time-sequenced beams of red, green and blue light, wherein the output beams are highly synchronized and exhibit substantially similar colorimetry, including spectrum and balance of red, green and blue light; and a digital micromirror device for modulating the time-sequenced beams of red, green and blue light to create an image. In another aspect, a light engine is provided for a tiled projection system having at least two projectors, comprising a color wheel having a plurality of color phosphor portions; a light source for generating a beam of light; a beam splitter for splitting the beam of light into at least two highly correlated beams to illuminate the wheel at different locations for generating at least two time-sequenced beams of identical red, green and blue light; and a digital micromirror device in each of the projectors for modulating the highly correlated beams to create a tiled image.

14 Claims, 4 Drawing Sheets

(56) References Cited

U.S. PATENT DOCUMENTS

| | | | |
|---|---|---|---|
| 2007/0058140 A1* | 3/2007 | Kobayashi et al. | 353/94 |
| 2008/0084543 A1* | 4/2008 | Gilbert et al. | 353/30 |
| 2009/0290128 A1* | 11/2009 | George | 353/31 |
| 2011/0211333 A1 | 9/2011 | Bartlett | |
| 2012/0133846 A1* | 5/2012 | Ishii | 348/744 |
| 2012/0201030 A1 | 8/2012 | Yuan et al. | |
| 2013/0021582 A1* | 1/2013 | Fujita et al. | 353/31 |
| 2013/0033651 A1* | 2/2013 | Haraguchi et al. | 348/744 |
| 2013/0229634 A1* | 9/2013 | Hu et al. | 353/84 |

* cited by examiner

MULTI-COLOR ILLUMINATION APPARATUS

BACKGROUND OF THE INVENTION

1. Field of the Invention

The present invention relates in general to projection systems, and more particularly to the use of multiple illumination sources for illuminating a phosphor color wheel in a projection system.

2. Description of the Related Art

It is known in the art to produce multi-colored light from a single light source. For example, a phosphor color wheel may be used to produce colored light by shining light of a first wavelength on a plurality of different regions of the wheel, where at least one of these regions comprises a phosphor that fluoresces at a second wavelength when illuminated with light of the first wavelength. By spinning the wheel relative to the stationary light source so as to sequentially illuminate the different regions of the wheel, different colors are produced by the wheel.

Conventional phosphor color wheels comprise a red, green, and blue segments that are either transmissive (i.e. colored filters) or reflective. As an example, where blue excitation light is used, one region of the wheel may be made transparent (or reflective), while the two other regions contain phosphors for absorbing the blue excitation wavelength and re-emit light at red and green wavelengths, respectively. Thus, only a fraction of the light produced by the light source is transmitted through the color wheel. The amount of light that can be generated by a phosphor color wheel is therefore restricted by the flux limit of excitation light incident on the wheel, and by the efficiency of the wheel in converting that light to other wavelengths. The lifetime of the wheel is compromised by the fact that the phosphor degrades quickly if it is not kept within a predetermined temperature range, which in turn limits the intensity of incident light on the wheel.

Color wheels have a myriad of applications, such as set forth in U.S. Pat. No. 2,416,301, issued Feb. 25, 1947 to Columbia Broadcasting System; U.S. Pat. No. 7,651,243, issued Jan. 26, 2010 to Optical Research Associates; and pending Patent Application Publication US2012/0201030, filed Feb. 6, 2012, and assigned to Intematix Corporation.

One such application is for generating multi-colored light in color digital projectors. Digital Light Processing (DLP) refers to projector technology that uses a digital micromirror device (DMD) to project an image onto a screen. A typical DLP projector includes a lamp, an illumination system, and a light engine comprising a DMD in combination with a spinning phosphor color wheel. For single-chip DMD light engines, the color wheel has different color filter segments (e.g. absorption filters or interference filters) such that when light illuminates the spinning color wheel different wavelengths of light (colors) pass through the wheel and onto the DMD at different times over the course of one rotation of the wheel.

The DMD is a micro-electro-mechanical system (MEMS) device consisting of a large array of microscopic mirrors that modulate light by independently flipping each mirror through a predetermined angle. The DMD modulates light by turning the mirrors on and off several times during a video frame. A frame is divided into approximately 20 to 60 bit planes of different duration, based on bit sequence and frame rate. During a given bit plane each pixel on the screen is controlled by a single bit and is either driven 'ON' or 'OFF' for the entire duration of the plane. The number, duration, and location of the "ON" times are adjusted with respect to the timing of the frame for controlling the light level. Combining the 'ON' times for a given pixel gives the pixel its proper intensity.

Examples of traditional filter wheels (as opposed to phosphor color wheels) are set forth in U.S. Pat. No. 7,862,182, "OPTICAL SYSTEM FOR A PROJECTOR, AND CORRESPONDING PROJECTOR" (Thollot et al.), U.S. Pat. No. 7,871,168, "ILLUMINATION SYSTEM FOR DUAL-LAMP PROJECTOR" (Liu et al.) and U.S. Pat. No. 6,147,720, "TWO LAMP, SINGLE LIGHT VALVE PROJECTION SYSTEM" (Guerinot et al.).

The afore-noted U.S. Pat. No. 7,862,182 describes a color wheel for use with polarization-based liquid crystal imagers, as opposed to DLP projectors. FIG. 3 of the '182 patent shows a reflective embodiment (i.e. using LCOS devices), while FIG. 4 of the '182 patent shows a transmissive embodiment (i.e. using an LCD). Liquid crystal imagers require the use of polarized light, as discussed above, which does not work well with DLP technology.

In applications such as image-tiling, the images from two or more projectors are projected so as to be adjacent or to slightly overlap thereby creating a larger composite 'tiled' image. In such multiple projector systems, with individual un-synchronized light sources and color wheels, highly undesirable variations in color and/or brightness can arise between adjacent projectors as a result of different color balances between the primary colors and the independent light sources lagging each other by unpredictable and variable amounts.

SUMMARY OF THE INVENTION

It is an aspect of the present invention to provide a light engine for a DLP projection system that addresses the flux limit problem set forth above by illuminating different parts of the wheel. In one implementation, diametrically opposite areas of the phosphor color wheel are illuminated so that the phosphor can cool down before being re-illuminated at the other position. In another implementation, concentric rings of phosphor are used so that each ring is exposed to only one illumination event per wheel revolution. In this way, the phosphor can relax and cool in between illumination events. As a result, the phosphor wheel is capable of outputting more light.

According to another aspect, the problem of undesirable variations in color and/or brightness in tiled projectors is addressed by using a single phosphor color wheel and single light source that is split into multiple beams, such that the colors become synchronized in time and intensity.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE SOLE DRAWINGS

DETAILED DESCRIPTION OF THE PREFERRED EMBODIMENTS

Figure 1:
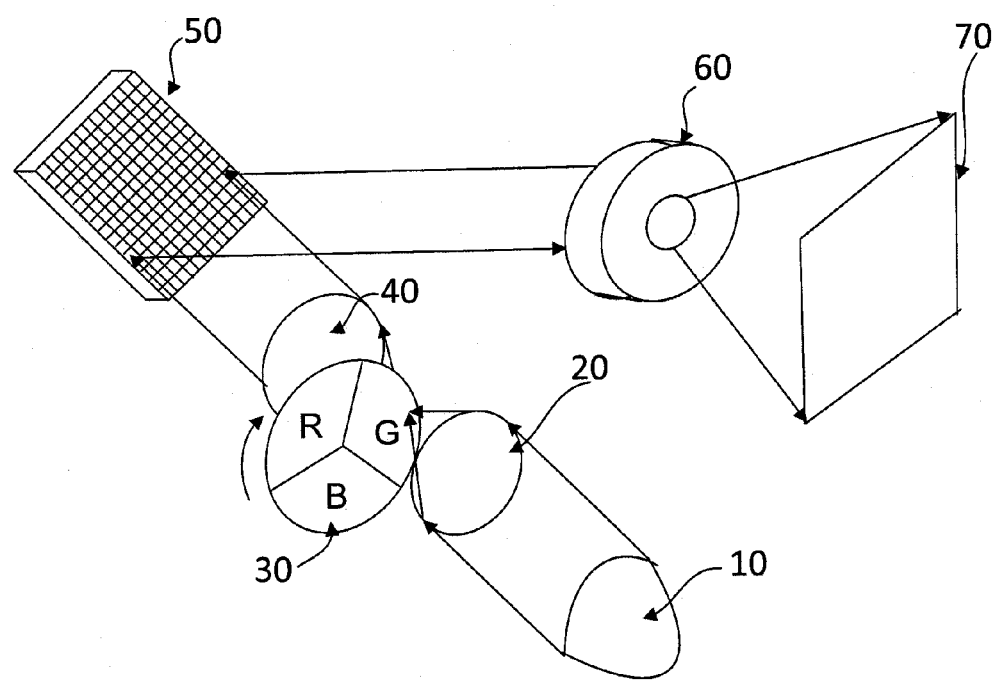
FIG. 1 is a schematic representation of a conventional color DLP digital projector.

FIG. 1 shows a conventional color DLP digital projector comprising a light source 10, such as a Xenon lamp and parabolic reflector, for creating a beam of light that is focused by condensing lens 20 onto a spinning phosphor color wheel 30. The colored light from wheel 30 is made rectangular by a set of one or more optics to homogenize shape, designated as 40 and is then relayed onto a spatial light modulator (SLM) 50, such as a DMD, LCD or grating light valve (GLV), and reflected to a projection lens 60 for projection onto a screen 70 to produce an image. A person of skill in the art will understand that light source 10 may be a laser or other suitable source of illumination. For example, where the light source is a blue laser, the blue segment (B) can be clear, a green phosphor coating may be applied for the green segment (G) and a red phosphor coating may be applied for the red segment (R). Also, as discussed above, the segments of wheel 30 may be made reflective rather than transmissive.

One problem of such prior art phosphor color wheel projectors is the flux limit of excitation light incident on the wheel 30, as discussed above.

Figure 2:
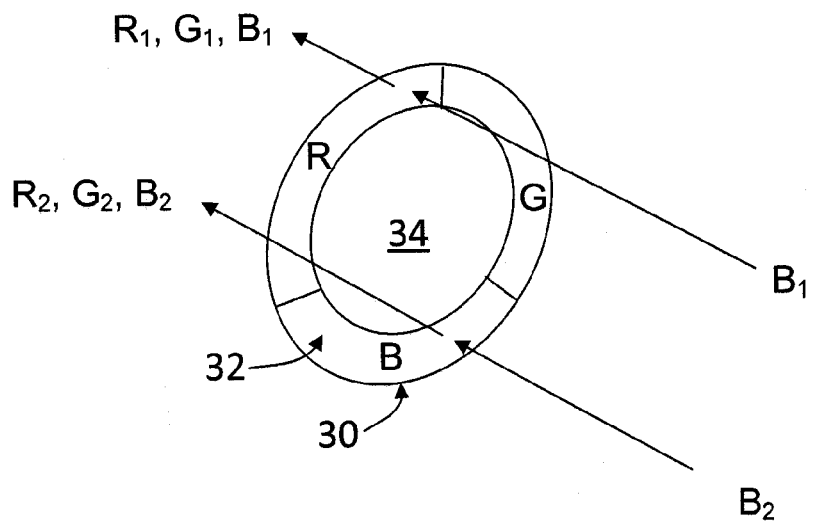
FIG. 2 is a schematic representation of a color wheel illuminated by multiple light sources, according to a first embodiment.

With reference to FIG. 2, a pair of light beams ($B_1$ and $B_2$) is used to illuminate the phosphor color wheel 30. In the illustrated embodiment, the portion 32 of wheel 30 that is illuminated by the two beams is of annular shape and the center region 34 is not used. However, a person of skill in the art will understand that the illuminated portions of the color wheel can be 'pie shaped', as in the conventional color wheel of FIG. 1, rather than annular, although such a conventional design uses more phosphor and would therefore be more expensive. Provided the incident beams $B_1$ and $B_2$ are substantially the same, then output beams $R_1$, $G_1$, $B_1$ and $R_2$, $G_2$, $B_2$ are highly synchronized and will exhibit substantially similar colorimetry, including spectrum and balance of RGB. The beams $R_1$, $G_1$, $B_1$ and $R_2$, $G_2$, $B_2$ can then be focused onto independent spatial light modulators (SLMs), or alternatively the wheel 30 can be constructed with six segments such that two points 180 degrees apart are the same color, so that the beams can be focused on the same SLM.

Figure 3A:
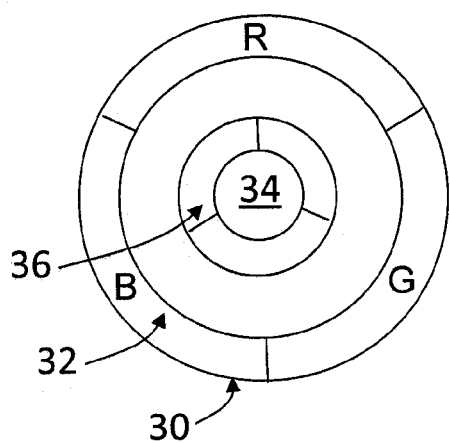
FIG. 3a is a schematic representation of a phosphor color wheel according to a second embodiment.
Figure 3B:
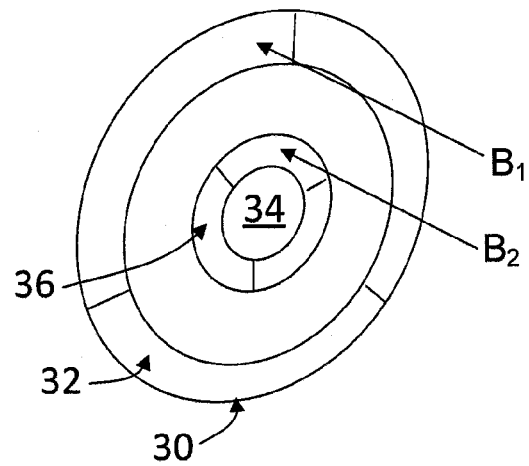
FIG. 3b is a schematic representation of the phosphor color wheel of FIG. 3a illuminated by multiple light sources.

According to an alternative embodiment, as shown in FIG. 3a, phosphor color wheel 30 is provided with an additional annular portion 36, which is positioned concentrically within annular portion 32, such that each portion 32 and 36 is independently illuminated by beams $B_1$ and $B_2$, respectively, as shown in FIG. 3b. In all other respects, the embodiment of FIG. 3a and FIG. 3b operates the same as the embodiment of FIG. 2. In particular, the phosphors in the RGB sections of portions 32 and 36 relax and cool in between illumination events thereby reducing phosphor degradation so that the wheel 30 outputs more light than the color wheel of FIG. 1, which is illuminated by a single beam. The inclusion of additional annular portion 36 effectively doubles the light output from color wheel 30. As discussed above, a person of skill in the art will appreciate that annular portions 32 and 36 may be reflective rather than transmissive. In the case of a reflective phosphor wheel 30, the two annular portions 32 and 36 can be on opposite sides or the same side of the wheel.

Figure 4:
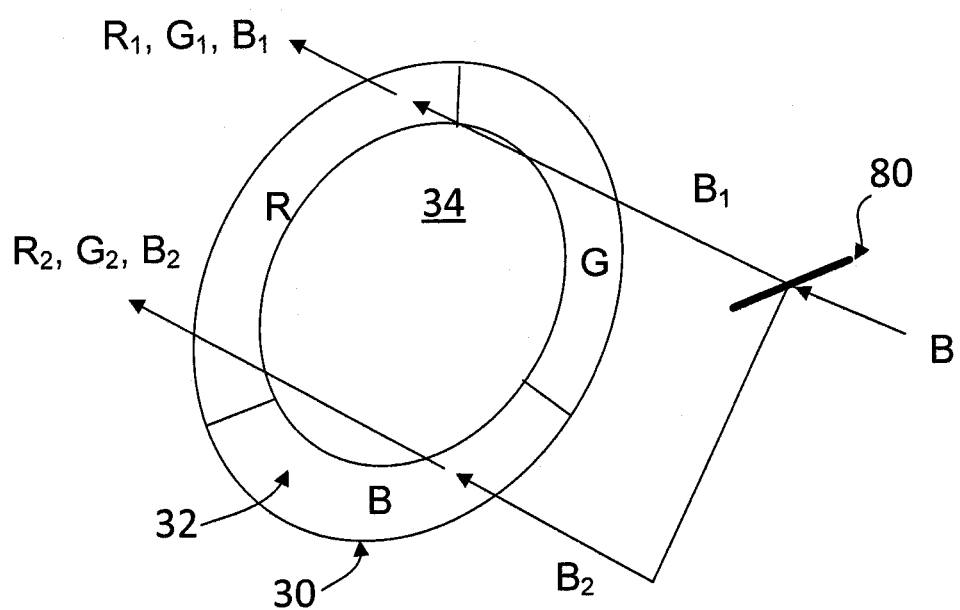
FIG. 4 is a schematic representation of a phosphor color wheel with a split light source, according to a third embodiment.

As discussed above, a second problem arises when multiple DLP projectors are arranged to create a composite tiled image, where the two projectors have independent (i.e. uncorrelated) light sources and optical paths that are difficult to match. As shown in the embodiment of FIG. 4, a light beam B is split using a beam splitter 80, such as a semi-transparent (50/50) reflector/transmitter, polarizing beam splitter, or other similar device, into separate but highly correlated beams $B_1$ and $B_2$, which then pass through diametrically opposite locations of annular phosphor portion 32. Since beams $B_1$ and $B_2$ are filtered using identical phosphors, the primary colors emitted (beams $R_1$, $G_1$, $B_1$ and $R_2$, $G_2$, $B_2$) are identical, the relative weighting of the colors is identical, and therefore the color balance between primary colors (and hence the white point) is identical. For example, in the case of a single blue illumination source B, the resulting time-sequenced RGB beams will be identical. In one embodiment, the color wheel with split light source of FIG. 4 may be incorporated into a single projector housing such that the $R_1$, $G_1$, $B_1$ and $R_2$, $G_2$, $B_2$ are projected along independent light paths. Alternatively, the $R_1$, $G_1$, $B_1$ and $R_2$, $G_2$, $B_2$ beams can be coupled into multiple projectors, for example via optical fibers or other suitable optical coupling mechanism.

Figure 5:
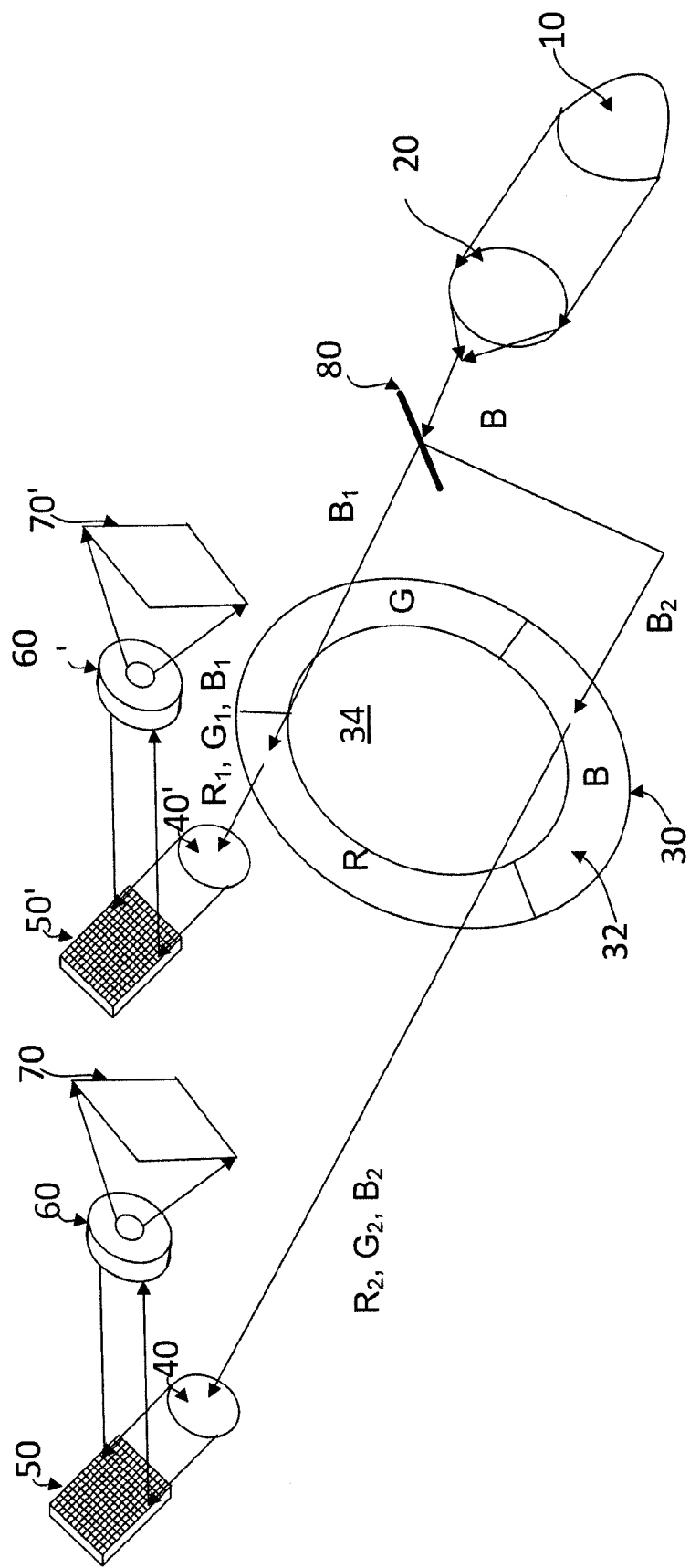
FIG. 5 is a schematic representation of a multi-color illumination apparatus for a tiled projection system having at least two projectors, according to a further embodiment.

Hence, depicted in FIG. 5 is a multi-color illumination apparatus for a tiled projection system having at least two projectors, comprising: a phosphor color wheel 30 having a plurality of color phosphor portions; a light source 10 for generating a beam of light B; a beam splitter 80 for splitting the beam of light into at least two highly correlated beams $B_1$ and $B_2$ to illuminate the wheel at different locations for generating at least two time-sequenced beams $R_1$, $G_1$, $B_1$ and $R_2$, $G_2$, $B_2$ of identical red, green and blue light; a set of optics 40, 40' and a spatial light modulator 50, 50' in each of the projectors for modulating the highly correlated beams to create a tiled image for projection onto a respective screen 70, 70' via a respective projection lens 60, 60'. The beam splitter 80 can be one of either a semi-transparent mirror or polarizing beam splitter. The different locations can be separated from one another along an annulus. The annulus can be transmissive. The annulus can be reflective. The color phosphor portions can comprise a first annulus of the phosphor color wheel for illumination by a first one of the highly correlated beams and a second annulus for illumination by a second one of the highly correlated beams. The first annulus and the second annulus can be transmissive. The first annulus and the second annulus can be reflective. The second annulus can be positioned concentrically within the first annulus.

In the case where two different blue sources illuminate the wheel, as in the embodiment of FIG. 2, the RG beams will be identical. However, there can be a slight difference in the blue primaries between paths, and of the relative brightness between paths. For example, different blue excitation sources could comprise differences of wavelength and intensity between the two sources. The difference in wavelength leads to color differences that may be apparent in the final projected image. Accordingly, for best results, blue lasers of very similar wavelength should be used. For the red (R) and green (G) light beams, the emission spectrum of a phosphor is not typically affected by the small difference in the illumination wavelength. However, the emission intensity is generally related to the excitation intensity. Therefore, R1/R2 and G1/G2 will differ in intensity only by the same amount as the difference in excitation intensities. However, there can be no variation in intensity because of the size of the phosphor segments since both paths use the same phosphor segments. The variation in intensity of white light is the same as for the blue excitation sources, which then follows into the RG emissions. However, the intensities directly track the blue sources such that a single correction or feedback may be used to address any variation. In any event, changes to the blue primary will affect the color of white, which is overcome by the embodiment of FIG. 4, wherein the single excitation source is split.

A person of skill in the art may conceive of other embodiments and variations. For embodiments with more than two excitations beams, the beams may illuminate different locations of the phosphor color wheel that are separated from one another along an annulus. Furthermore, in the embodiments described herein, a blue laser is used as the excitation source. However, a person of skill in the art will understand that other wavelengths are acceptable for exciting a phosphor. Also, where a blue laser is used as the excitation source, different blue excitation wavelengths may be used for the blue primary (e.g. 445 nm or 465 nm). These and other modifications and variations are believed to fall within the scope of the claims appended hereto.

What is claimed is:

1. A multi-color illumination apparatus for a tiled projection system having at least two projectors, comprising:
   a phosphor color wheel having a plurality of color phosphor portions;
   a light source for generating a beam of light;
   a beam splitter for splitting said beam of light into at least two highly correlated beams to illuminate said wheel at different locations for generating at least two time-sequenced beams of identical red, green and blue light; and
   a spatial light modulator in each of said projectors for modulating respective ones of said beams to create a tiled image.

2. The multi-color illumination apparatus of claim 1, wherein the plurality of color phosphor portions comprise adjacent phosphor segments emitting different respective colors.

3. The multi-color illumination apparatus of claim 1, wherein said light source comprises blue lasers.

4. The multi-color illumination apparatus of claim 1, wherein said beam splitter is one of either a semi-transparent mirror or polarizing beam splitter.

5. The multi-color illumination apparatus of claim 1, wherein said different locations separated from one another along an annulus.

6. The multi-color illumination apparatus of claim 1, wherein said color phosphor portions comprise a first annulus of said phosphor color wheel for illumination by a first one of said highly correlated beams and a second annulus for illumination by a second one of said highly correlated beams.

7. The multi-color illumination apparatus of claim 6, wherein each of said first annulus and said second annulus comprises respective adjacent phosphor segments emitting different respective colors.

8. The multi-color illumination apparatus of claim 6, wherein said first annulus and said second annulus are transmissive.

9. The multi-color illumination apparatus of claim 6, wherein said first annulus and said second annulus are reflective.

10. The multi-color illumination apparatus of claim 9, wherein said first annulus and said second annulus are on opposite sides of the wheel.

11. The multi-color illumination apparatus of claim 9 wherein said first annulus and said second annulus are on a same side of the wheel.

12. The multi-color illumination apparatus of claim 6, wherein said second annulus is positioned concentrically within the first annulus.

13. The multi-color illumination apparatus of claim 5, wherein said annulus is transmissive.

14. The multi-color illumination apparatus of claim 5, wherein said annulus is reflective.

* * * * *